Sept. 12, 1967  F. SOMMERFELD  3,340,573
METHOD AND APPARATUS FOR PRODUCING PLANAR OBJECTS FROM PLASTICS
Filed Jan. 17, 1964  3 Sheets-Sheet 1

INVENTOR
Franz Sommerfeld
BY Nolte & Nolte
Attorneys

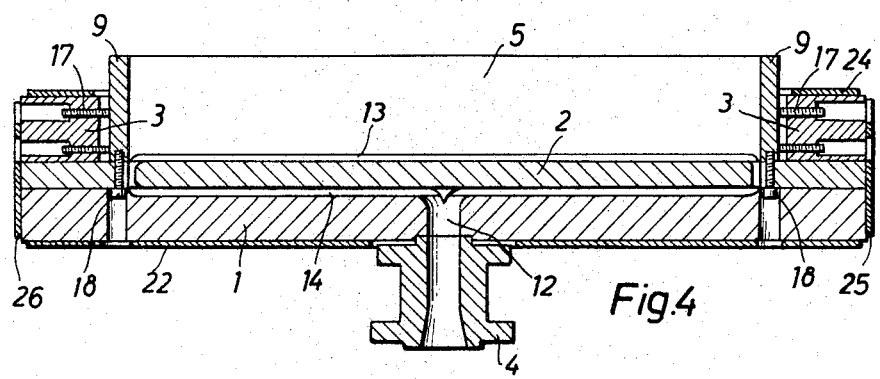
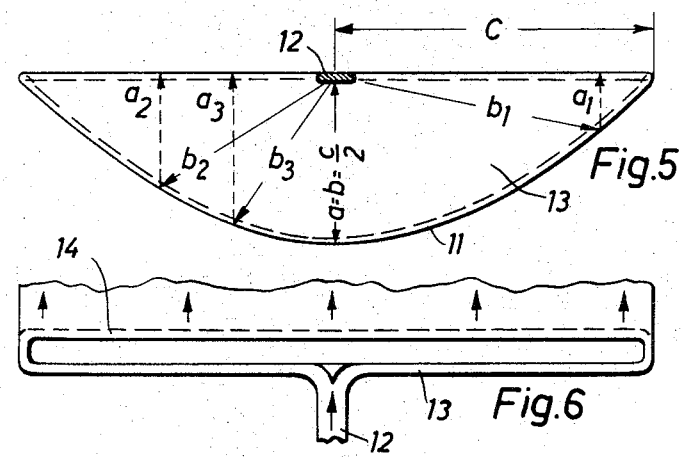
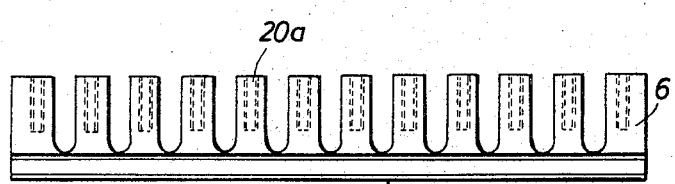 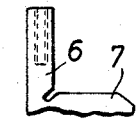

Sept. 12, 1967  F. SOMMERFELD  3,340,573
METHOD AND APPARATUS FOR PRODUCING PLANAR OBJECTS FROM PLASTICS
Filed Jan. 17, 1964  3 Sheets-Sheet 3

INVENTOR
Franz Sommerfeld
BY Nolte & Nolte
Attorneys

United States Patent Office 3,340,573
Patented Sept. 12, 1967

3,340,573
METHOD AND APPARATUS FOR PRODUCING
PLANAR OBJECTS FROM PLASTICS
Franz Sommerfeld, Frankfurter Strasse 267,
Porz-Wahn, Germany
Filed Jan. 17, 1964, Ser. No. 338,399
Claims priority, application Germany, Jan. 22, 1963,
S 83,360
7 Claims. (Cl. 18—12)

ABSTRACT OF THE DISCLOSURE

An apparatus for extruding planar foils from cord-like stream of plastic material having an inlet channel of circular cross-section, first chamber of arc-like configuration for spreading out the received plastic material; an overflow slot channel of arc cross-section, a second arc-like chamber with linear top opening and an adjustable outlet extension channel of linear wide slot cross-section, connected to said linear top opening.

This invention relates to a method and apparatus for manufacturing planar objects such as plates and foils from synthetic material by extruding plasticised synthetic masses from a fishtail (wide slot) nozzle.

With conventional fishtail nozzles used for the manufacture of plastic planar articles, the times required for the synthetic substances to pass through the nozzle show noticeable differences. As a result, the finished products exhibit considerably different mechanical and physical properties, as well as appearances. This is particularly evident with substances which are sensitive to thermal stress, such as polyvinyl chloride (hard) and similar materials wherein the sides of the extruded article may be more uniform in their exterior appearance than are the center strips. The different retention times of the known fishtail nozzles are due to the fact that the distribution of the synthetic material streaming out in a cord-like shape (e.g., from a screw extruder) is dependent upon the action of dynamic air-pressure elements which are either rigidly built in the fishtail nozzle or are exteriorly controlled. In most cases both measures prevail. The use of dynamic air-pressure elements also results in a considerable waste of time in tuning the fishtail nozzle to the existing working conditions. Alterations in the fixed operating conditions, the selection of a different angular velocity of the extrusion machine, or the choice of different working temperatures are factors which all necessitate additional adjustment of the fishtail nozzle during operation, resulting in a further waste of time and material.

There are fishtail nozzles known in the prior art in which approximately uniform retention times are achieved for synthetic substances passing through the nozzle. This is accomplished by continuously splitting the plastic cord entering the fishtail nozzle in half. However, such severing of the plastic flow into several separate streams results in so-called seam spots at points where the individual streams become re-united prior to leaving the fishtail nozzle, and these entail the risk of disrupting the uniformity of the mechanical or physical properties of the finished planar objects. In addition, these seam spots are almost always optically perceivable. Finally, the splitting of the stream into a multiple sequence requires a considerable increase in the length of the machine.

Accordingly, an object of the invention is to provide a method and apparatus for producing flat objects from plastic substances with the aid of a fishtail nozzle while avoiding the aforementioned drawbacks.

The invention effects the distribution of extruded plastic material having a cord-like cross section, on the flat, rectangular cross section of foils or plates through a fan-shaped opening by dividing and converting the plastic stream into a parallel flow past suitably formed guide means. This is carried out by securing a uniform length of all of the mass-stream lines from before the plastic material enters the fishtail nozzle until it leaves, the plastic stream maintaining its cohesion. The division of the plastic stream into separate streams which travel on paths of uniform length results in uniform retention time of the individual streams, which keep their cohesion, thus eliminating the drawbacks enumerated above.

The apparatus according to the invention includes a fishtail nozzle consisting of two side lateral plates and a third plate clamped between the lateral plates, wherein the spaces for the plastic mass are formed by lateral circular recesses machined in the surfaces of the side plates and/or the center plate, the latter containing a circular overflow groove for the passage of the mass from the inlet side to the outlet side across the center plate.

In a specific embodiment of the invention, the plates are held together by fasteners disposed outside of the area of the entire channel for the synthetic mass and within the fishtail nozzle, so that the channel contains no flanges or the like which might hamper the flow of the mass.

According to the invention the upper nozzle lip cooperates with a guide piece, perpendicular thereto and movable in the direction of the nozzle duct, the lip being resiliently shiftable through a recess in the apex of the angle.

In the appended drawings, an embodiment of the invention is represented, wherein:

FIG. 4 represents a section along A–B in FIG. 1;

FIG. 5 shows a sight viewed from the side of the intake of the plastic material into the fishtail nozzle, wherein only the channel for the stock is represented without the construction parts of the fishtail nozzle forming said channel;

FIG. 6 shows a plan view of the apparatus of FIG. 5;

FIG. 7 represents a view of the upper lip with the guide piece;

FIG. 8 is a side elevational view to FIG. 7;

Figure 1:
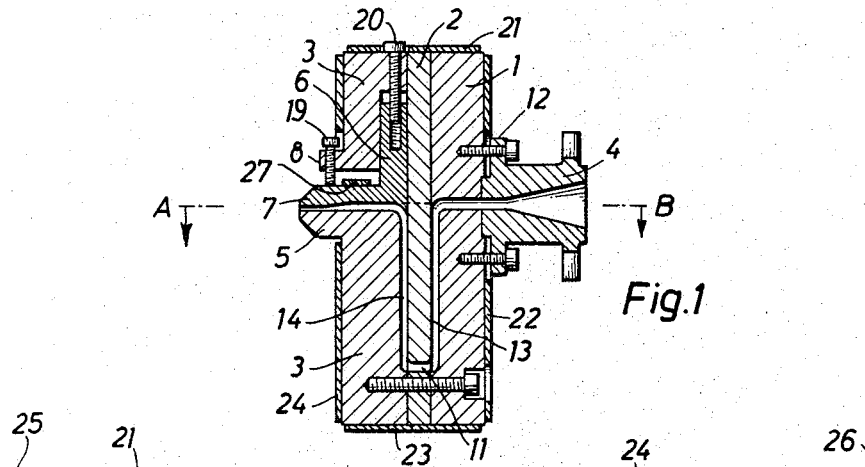
FIG. 1 shows a central cross section through the side elevational view of the fishtail nozzle.
Figure 9:
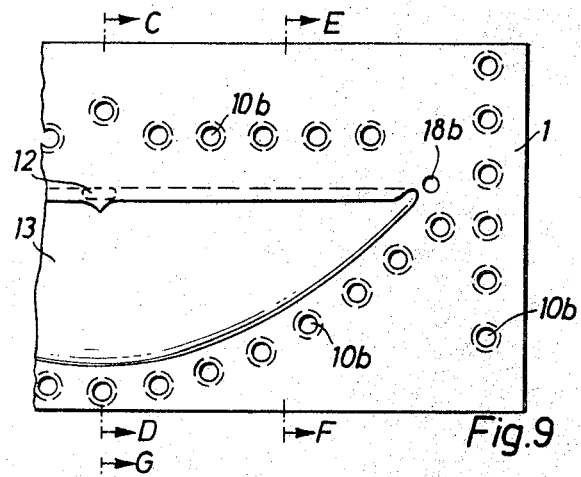
FIG. 9 is a view of the inside of the base plate in fractional representation.
Figures 10, 11:
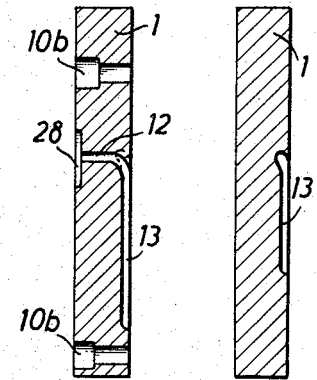
FIG. 10 is a section along C–D in FIG. 9.
FIG. 11 is a section along E–F in FIG. 9.
Figure 12:
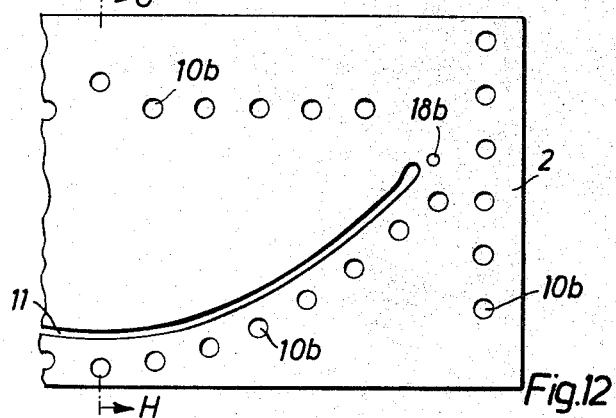
FIG. 12 is a view of the plate.
Figure 13:
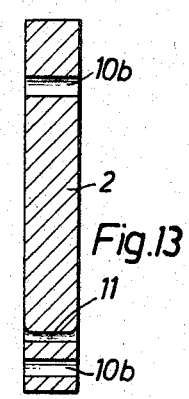
FIG. 13 shows a sectional side elevation along G–H in FIG. 12.
Figure 14:
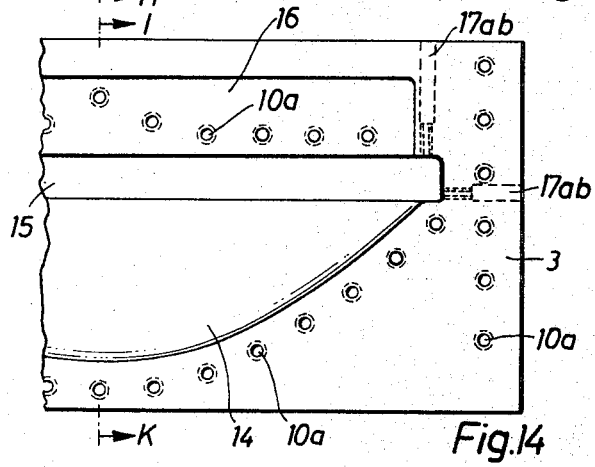
FIG. 14 represents a view of the inside of the plate.
Figure 15:
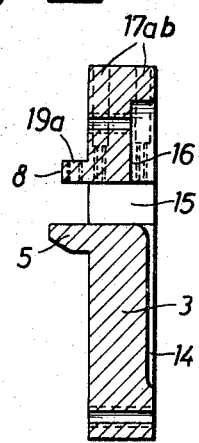
FIG. 15 is a sectional side elevation along I–K in FIG. 14.

The nozzle head consists of plates 1, 2 and 3, which are screwed together by bolts 10b and aligned with each other by suitable means not illustrated. Plate 1 is represented separately in FIGS. 9, 10 and 11; the plate is machined over its surface and includes a vertical recess 13 (FIG. 5) into which a transverse channel 12 opens at the top center. The channel 12 is limited on the other side of plate 1 by a circular recess 28 (FIG. 10) which receives connecting piece 4 (FIG. 1). Plate 2 is shown in FIGS. 12 and 13 and is also machined over its entire surface. A semi-circular slot 11 is machined into plate 2. Plate 3, shown in detail in FIGS. 14 and 15, is similarly machined and includes a recess 14 which is limited by a through slot 15. The lower surface of the slot 15 extends into the lower lip 5. The upper surface of slot 15 opens into a ledge 8 which includes a vertical female screw thread 19a. Above the through slot 15 there is an opening 16 which receives a guide piece 6 cooperating with and transverse to an elongated upper lip 7 (FIGS. 1 and 8). By uniting the plates 1, 2 and 3 as shown in FIGS. 1 and 4, the recesses 13 and 14 will form together with plate 2 spaces which are in communication with through slot 11 in plate 2.

Connecting piece 4 joins the fishtail nozzle to a screw extruder, for example, which is screwed onto plate 1 in the extension of the channel 12.

The upper lip 7 together with the guide piece 6 form the upper limit of the space 13, and together with the lower lip 5, forms the nozzle duct itself. The guide member 6 is movably disposed in the opening 16 in the plate 3, shifting being effected by actuation of bolts 20. Bolts 20 may be differential screws, known per se, which when turned just one worm to the right or to the left-hand side will effect the raising or lowering of the guide member 6 at the spot desired. However, for the sake of simplicity, tractor screws 20 are represented in the diagram. The upper lip 7, which is somewhat resilient in relation to the guide member 6 is set to the desired magnitude of the extrusion orifice by using the screws 18 and the female screw thread 18a (FIG. 4). For such purposes it is possible to use tractor or pressing screws or even differential bolts. The upper lip 7 and the guide member 6 may be exchanged to meet different requirements of the extrusion process.

Figure 2:
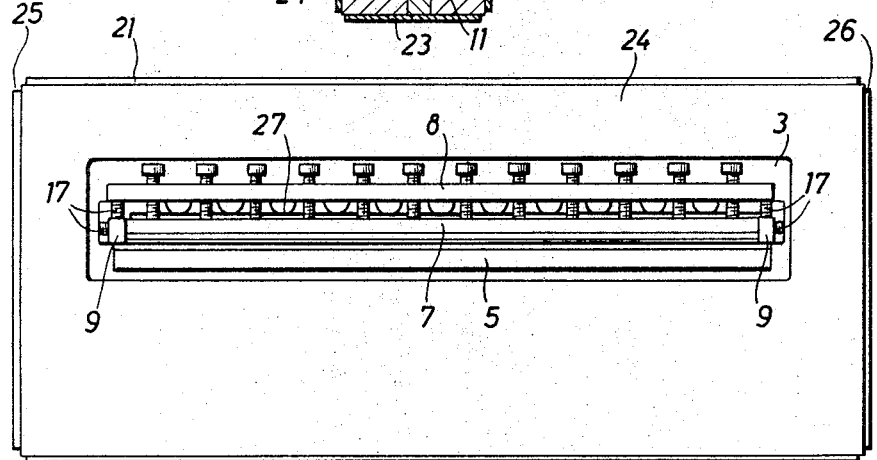
FIG. 2 represents the elevational view of FIG. 1, as well as the extrusion orifice of the fishtail nozzle.
Figure 3:
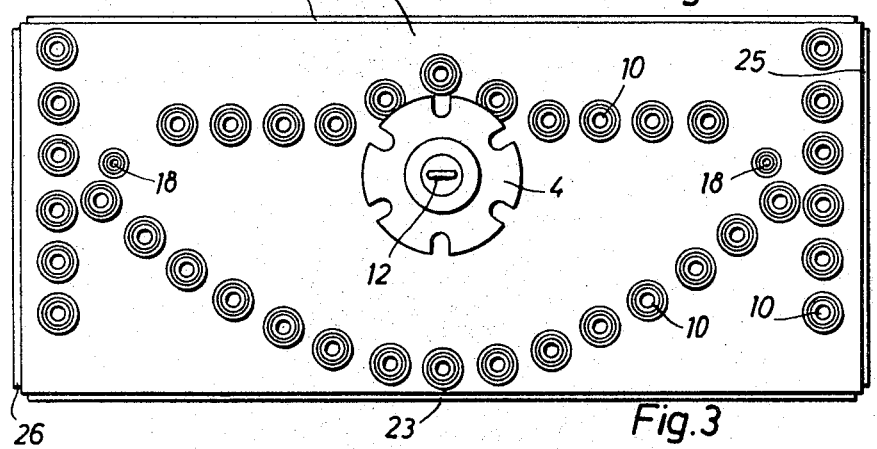
FIG. 3 shows the back side of the nozzle with the intake port for the synthetic substance.

The two ledges 9 serve to tighten the extrusion orifice to the side. By means of the two screws 18 and the through-holes 18b in plates 1 and 2, ledges 9 are first drawn against plate 2. By means of the setscrews 17 and the boreholes 17ab, ledges 9 are pressed against the lower surface of the slot 15 onto the lower lip 5, and against the ends of the upper lip 7 (FIG. 2).

Parts 21 to 27 represent the conventional heating elements which impart to the fishtail nozzle elements the necessary working temperature required for processing plastic materials. If desired, the two ledges 9 may be heated separately.

The plastic substance is pressed, for example, by a screw extruder, into the space 13 through the channel 12. The orifice 11 in the plate 2 has a position in relation to the center of the channel 12 to secure—according to the representation in FIG. 5—that the requirement $a+b=c$ shall always be met. In the center of the space 13, $a$ is equal to $b$ which is equal to $c/2$. From the middle of the mouth of the channel 12 the synthetic material will spread out into the space 13 in a ray-shaped manner—as shown by the arrows $b_1$, $b_2$, $b_3$ in FIG. 5, and then through the nozzle as described above.

What I claim is:
1. An apparatus for manufacturing planar products from a stream of plastic material comprising an inlet channel for receiving said stream of plastic material; a first chamber having an arc shaped bottom, coplanar walls and a linear top connected with said inlet channel; a second chamber having substantially the same configuration as said first chamber and being arranged in spaced relationship with the latter; an overflow channel having an arc-shaped cross-section and connecting circumferentially said first and second chamber to overflow said plastic material from one chamber to another; an outlet extrusion channel having a linear wide slot cross-section and being connected to the linear top of said second chamber.

2. The apparatus according to claim 1 consisting of a first side plate, a second side plate and a third plate clamped between said side plates wherein said first side plate comprises said inlet channel and a recess forming the interior of said first chamber; said third plate comprises said arc shaped wide slot channel and said second side plate comprises a recess, forming the interior of said second chamber, and said outlet extrusion channel.

3. The apparatus according to claim 2 wherein said outlet extrusion channel comprises at least one adjustable duct member for adjusting the width of outgoing material.

4. The apparatus according to claim 2 wherein said outlet extrusion channel comprises an adjustable top member for adjusting the height of outgoing material.

5. The apparatus according to claim 3 wherein the outer ends of the top and bottom surface of said outlet extrusion channel are prolongated in the form of lips.

6. The apparatus according to claim 5 wherein the upper lip is resiliently adjustable.

7. The apparatus according to claim 1 wherein the curvature of the bottom of said first chamber is the locus of a point meeting the requirement $a+b=c$, wherein $a$ is distance of said point from the mouth of said inlet channel, $b$ is its perpendicular distance from the linear top and $c$ is a constant.

References Cited
UNITED STATES PATENTS

| | | | |
|---|---|---|---|
| 2,090,404 | 8/1937 | Parkhurst | 18—12 |
| 2,734,224 | 2/1956 | Winstead | 18—12 |
| 3,065,502 | 11/1962 | Lorenian. | |
| 3,145,419 | 8/1964 | Reifenhauser | 18—12 |
| 3,197,815 | 3/1965 | Van Riper | 18—12 |
| 3,255,488 | 6/1966 | Waldherr | 18—12 |

WILLIAM J. STEPHENSON, *Primary Examiner.*